United States Patent
Wang et al.

(10) Patent No.: US 10,819,850 B2
(45) Date of Patent: Oct. 27, 2020

(54) CALL SWITCHING METHOD, TERMINAL DEVICE, AND STORAGE MEDIUM

(71) Applicant: Huawei Technologies Co., Ltd., Shenzhen (CN)

(72) Inventors: Zaishang Wang, Beijing (CN); Lei Chen, Beijing (CN); Junfeng Su, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/097,159

(22) PCT Filed: Apr. 29, 2016

(86) PCT No.: PCT/CN2016/080843
§ 371 (c)(1),
(2) Date: Oct. 26, 2018

(87) PCT Pub. No.: WO2017/185381
PCT Pub. Date: Nov. 2, 2017

(65) Prior Publication Data
US 2019/0268467 A1    Aug. 29, 2019

(51) Int. Cl.
*H04M 3/42* (2006.01)
*H04W 48/18* (2009.01)
(Continued)

(52) U.S. Cl.
CPC ... *H04M 3/42374* (2013.01); *H04W 36/0022* (2013.01); *H04W 48/18* (2013.01);
(Continued)

(58) Field of Classification Search
CPC . H04W 48/18; H04W 76/10; H04W 36/0022; H04W 76/14; H04W 36/14; H04W 88/06
See application file for complete search history.

(56) References Cited

U.S. PATENT DOCUMENTS

| 2007/0183394 A1* | 8/2007 | Khandelwal ........ H04L 12/5692 370/352 |
| 2009/0180440 A1 | 7/2009 | Sengupta et al. |

(Continued)

FOREIGN PATENT DOCUMENTS

| CN | 1798427 A | 7/2006 |
| CN | 101001464 A | 7/2007 |

(Continued)

*Primary Examiner* — Jeffrey M Rutkowski
*Assistant Examiner* — Chae S Lee
(74) *Attorney, Agent, or Firm* — Slater Matsil, LLP

(57) ABSTRACT

A call switching method includes: when a first terminal device detects an input operation that is of initiating a call request to a second terminal device, or when a first terminal device receives a first call request that is initiated by a second terminal device by using a second-type communications network, detecting whether both the first terminal device and the second terminal device are in a first-type communications network; and when the first terminal device detects that both the first terminal device and the second terminal device are in the first-type communications network, initiating a second call request to the second terminal device by using the first-type communications network, or sending first prompt information to the second terminal device.

19 Claims, 5 Drawing Sheets

(51) Int. Cl.
    *H04W 76/10* (2018.01)
    *H04W 36/00* (2009.01)
    *H04W 76/14* (2018.01)
    *H04W 36/14* (2009.01)
    *H04W 88/06* (2009.01)

(52) U.S. Cl.
    CPC ........... *H04W 76/10* (2018.02); *H04W 76/14* (2018.02); *H04M 3/42059* (2013.01); *H04M 3/42102* (2013.01); *H04M 2207/18* (2013.01); *H04W 36/14* (2013.01); *H04W 88/06* (2013.01)

(56) References Cited

U.S. PATENT DOCUMENTS

| | | | |
|---|---|---|---|
| 2009/0262733 A1 | 10/2009 | Olson | |
| 2011/0003585 A1* | 1/2011 | Wang | H04M 1/72583 455/418 |
| 2011/0195693 A1* | 8/2011 | Nagasawa | H04M 3/42374 455/412.2 |
| 2012/0170503 A1 | 7/2012 | Kelley et al. | |
| 2012/0315905 A1 | 12/2012 | Zhu et al. | |
| 2013/0208658 A1* | 8/2013 | Santos | H04L 65/1069 370/328 |
| 2014/0211666 A1 | 7/2014 | Gillett | |
| 2014/0314022 A1* | 10/2014 | Rathnam | H04W 76/10 370/329 |
| 2015/0029881 A1 | 1/2015 | Finlayson | |
| 2015/0319277 A1* | 11/2015 | Niu | H04W 36/0011 370/331 |
| 2015/0358878 A1 | 12/2015 | Ho et al. | |
| 2016/0112941 A1* | 4/2016 | Desai | H04L 12/145 370/329 |

FOREIGN PATENT DOCUMENTS

| | | |
|---|---|---|
| CN | 101588617 A | 11/2009 |
| CN | 103298143 A | 9/2013 |
| CN | 103458215 A | 12/2013 |
| CN | 103716849 A | 4/2014 |
| CN | 104602361 A | 5/2015 |
| CN | 104902115 A | 9/2015 |
| CN | 105101325 A | 11/2015 |
| WO | 2015147576 A1 | 10/2015 |

* cited by examiner

CALL SWITCHING METHOD, TERMINAL DEVICE, AND STORAGE MEDIUM

CROSS-REFERENCE TO RELATED APPLICATIONS

This application is a National Stage of International Application No. PCT/CN2016/080843, filed on Apr. 29, 2016, which is hereby incorporated by reference in its entirety.

TECHNICAL FIELD

The present disclosure relates to the field of communications technologies, and in particular, to a call switching method, a terminal device, and a storage medium.

BACKGROUND

With continuous development of communications technologies, it is not a problem to make a call anytime anywhere. Currently, a voice call is usually bound with a subscriber identity module (SIM for short), and an operator provides a voice call service. Usually, a specific network is used in a call process. For example, the China Mobile Communications Corporation and the China United Network Communications Group CO., Ltd provide voice call services by using the Global System for Mobile Communications (GSM for short). The China Telecom Corporation provides a voice call service by using a Code Division Multiple Access (CDMA for short) technology. In the industry, a conventional voice call technology is referred to as circuit switched (CS for short) domain voice.

However, because the conventional voice call has a single choice in terms of a voice call network and tariffs of the conventional voice call are relatively high, multiple other call networks have been further developed. For example, a wireless local area network call manner implemented by means of Wireless Fidelity (WiFi for short) is referred to as a WiFi call in the industry. For another example, a call technology based on a Long Term Evolution (LTE for short) system is referred to as a VoLTE (Voice over LTE) call or is referred to as an Internet Protocol multimedia subsystem (IMS for short) call in the industry.

During actual use, a user may select one call network to make a call. Therefore, the user may have multiple choices.

SUMMARY

Embodiments of the present disclosure provide a call switching method, a terminal device, and a storage medium, to resolve a prior-art technical problem that call network selection is not flexible enough because a user manually selects a call network.

According to a first aspect, an embodiment of the present disclosure provides a call switching method, including: when a first terminal device detects an input operation that is of initiating a call request to a second terminal device and that is input by a user, or when a first terminal device receives a first call request that is initiated by a second terminal device by using a second-type communications network, detecting, by the first terminal device, whether both the first terminal device and the second terminal device are in a first-type communications network; and when the first terminal device detects that both the first terminal device and the second terminal device are in the first-type communications network, initiating, by the first terminal device, a second call request to the second terminal device by using the first-type communications network, where the first-type communications network is different from the second-type communications network.

In the method in this embodiment of the present disclosure, the terminal device automatically determines network types of communications networks to which a calling party and a called party are connected, and then automatically selects a call network. Compared with manual call network selection in the prior art, the method in this embodiment of the present disclosure has more flexible technical effects.

With reference to the first aspect, in a first possible implementation of the first aspect, the method further includes: when the first terminal device detects that not both the first terminal device and the second terminal device are in the first-type communications network, initiating, by the first terminal device, a third call request to the second terminal device by using the second-type communications network. In this way, it can be ensured that the first terminal device can communicate with the second terminal device, instead of establishing the communication after both the first terminal device and the second terminal device are in the first-type communications network.

With reference to the first aspect or the first possible implementation of the first aspect, in a second possible implementation of the first aspect, the method further includes: rejecting, by the first terminal, the first call request when the first terminal device detects that both the first terminal device and the second terminal device are in the first-type communications network. By means of the method, only one type of communications network may be used to perform communication, while another type of communications network is rejected. Therefore, power consumption of the terminal device can be reduced.

With reference to the first aspect, the first possible implementation of the first aspect, or the second possible implementation of the first aspect, in a third possible implementation of the first aspect, before the first terminal device abandons the first call request that is initiated by the second terminal device to the first terminal device by using the second-type communications network, the method further includes: determining, by the first terminal device, that signal quality of the first-type communications network meets a preset condition. By means of the method, call quality can be ensured to a greater extent.

With reference to the first possible implementation of the first aspect or the third possible implementation of the first aspect, in a fourth possible implementation of the first aspect, the detecting, by the first terminal device, whether both the first terminal device and the second terminal device are in a first-type communications network includes: receiving, by the first terminal device, second prompt information sent by the second terminal device, where the second prompt information includes a network type of a communications network to which the second terminal device is currently connected; and detecting, by the first terminal device according to a network type of a communications network to which the first terminal device is currently connected and the second prompt information, whether both the first terminal device and the second terminal device are in the first-type communications network. By means of the method, the first terminal device can rapidly determine whether both the first terminal device and the second terminal device are in the first-type communications network. Further, it can be ensured that when the first terminal device cannot be connected to a server, the first terminal device can normally perform the method in the first aspect.

With reference to the first possible implementation of the first aspect or the third possible implementation of the first aspect, in a fifth possible implementation of the first aspect, the detecting, by the first terminal device, whether both the first terminal device and the second terminal device are in a first-type communications network includes: receiving, by the first terminal device, third prompt information sent by the second terminal device, where the third prompt information is used to indicate whether both the first terminal device and the second terminal device are in the first-type communications network; and determining, by the first terminal device according to the third prompt information, whether both the first terminal device and the second terminal device are in the first-type communications network. By means of the method, the first terminal device can directly obtain a detection result, and therefore, can more rapidly determine whether both the first terminal device and the second terminal device are in the first-type communications network. Further, it can be ensured that when the first terminal device cannot be connected to a server, the first terminal device can normally perform the method in the first aspect.

According to a second aspect, an embodiment of the present disclosure provides a call switching method, including: when a first terminal device receives a first call request that is initiated by a second terminal device by using a second-type communications network, or when a first terminal device detects an input operation that is of initiating a call request to a second terminal device and that is input by a user, detecting, by the first terminal device, whether both the first terminal device and the second terminal device are in a first-type communications network; and when both the first terminal device and the second terminal device are in the first-type communications network, abandoning, by the first terminal device, the first call request, and sending, by the first terminal device, first prompt information to the second terminal device, where the first prompt information is used to indicate that both the first terminal device and the second terminal device are in the first-type communications network, and the first-type communications network is different from the second-type communications network.

In this embodiment of the present disclosure, the first terminal device automatically detects network statuses of a calling device and a called device, and sends, to a peer terminal device, prompt information indicating that a call network can be switched, so that the peer terminal device can directly switch the call network based on the prompt. Therefore, a step of detecting the network by the peer terminal device is saved, and switching time is reduced.

With reference to the foregoing possible implementation, the detecting, by the first terminal device, whether both the first terminal device and the second terminal device are in a first-type communications network includes: determining, by the first terminal device, that the first terminal device is in the first-type communications network; sending, by the first terminal device, a query request to a server, where the query request is used to query for a network type of a communications network to which the second terminal device is currently connected, and the server records the network type of the communications network to which the second terminal device is currently connected; receiving, by the first terminal device, a query result sent by the server, where the query result includes the network type of the communications network to which the second terminal device is currently connected; and detecting, by the first terminal device according to the query result, whether both the first terminal device and the second terminal device are in the first-type communications network. By means of the method, the network type of the communications network to which the second terminal device is currently connected can be accurately obtained.

With reference to the foregoing possible implementations, when the second call request is a video call request, after the second call request is responded, the method further includes: determining, by the first terminal device, whether signal quality of the first-type communications network meets a preset condition; when the signal quality of the first-type communications network does not meet the preset condition, initiating, by the first terminal device, a voice call request to the second terminal device by using the second-type communications network; and after the voice call request is responded, sending and receiving, by the first terminal device, audio data of the video call by using the second-type communications network, and sending and receiving image data of the video call by using the first-type communications network. In the method in this embodiment of the present disclosure, signal quality of a current video call network is automatically determined, and then, a voice call is established and audio data and image data of a video call are separately transmitted on two networks, to ensure communication quality of the video call.

With reference to the foregoing possible implementations, after the voice call request is responded, the method further includes: determining, by the first terminal device, whether the signal quality of the first-type communications network meets the preset condition; and when the signal quality of the first-type communications network meets the preset condition, canceling, by the first terminal device, a voice call that is initiated by using the second-type communications network, and sending and receiving the audio data and the image data of the video call by using the first-type communications network. In this solution, signal quality of a video call network is detected, and then, audio data and image data that are originally separately transmitted on two networks are transmitted by using the video call network, and a voice call is cut off. In this way, tariffs and power consumption are reduced.

According to a third aspect, an embodiment of the present disclosure provides a call switching method, including: when a first terminal device and a second terminal device make a video call by using a first-type communications network, determining, by the first terminal device, whether signal quality of the first-type communications network meets a preset condition; when the signal quality of the first-type communications network does not meet the preset condition, initiating, by the first terminal device, a voice call request to the second terminal device by using a second-type communications network; and after the voice call request is responded, sending and receiving, by the first terminal device, audio data of the video call by using the second-type communications network, and sending and receiving image data of the video call by using the first-type communications network, where the first-type communications network is different from the second-type communications network.

In the method in this embodiment of the present disclosure, signal quality of a current video call network is automatically determined, and then, a voice call is established and audio data and image data of a video call are separately transmitted on two networks, to ensure communication quality of the video call.

With reference to the third aspect, in a first possible implementation of the third aspect, after the voice call request is responded, the method further includes: determining, by the first terminal device, whether the signal quality of the first-type communications network meets the preset condition; and when the signal quality of the first-type communications network meets the preset condition, canceling, by the first terminal device, a voice call that is initiated by using the second-type communications network, and sending and receiving the audio data and the image data of the video call by using the first-type communications network. In this solution, signal quality of a video call network is detected, and then, audio data and image data that are originally separately transmitted on two networks are transmitted by using the video call network, and a voice call is cut off. In this way, tariffs and power consumption are reduced.

According to a fourth aspect, an embodiment of the present disclosure provides a call switching method, including: when a first terminal device and a second terminal device make a voice call by using a second-type communications network, establishing, by the first terminal device, a video call with the second terminal device by using a first-type communications network; determining, by the first terminal device, whether signal quality of the first-type communications network meets a preset condition; and when the signal quality of the first-type communications network does not meet the preset condition, sending and receiving, by the first terminal device, audio data of the video call by using the second-type communications network, and sending and receiving image data of the video call by using the first-type communications network, where the first-type communications network is different from the second-type communications network.

With reference to the fourth aspect, in a first possible implementation of the fourth aspect, the method further includes: determining, by the first terminal device, whether the signal quality of the first-type communications network meets the preset condition; and when the signal quality of the first-type communications network meets the preset condition, canceling, by the first terminal device, the voice call that is initiated by using the second-type communications network, and sending and receiving the audio data and the image data of the video call by using the first-type communications network.

According to a fifth aspect, an embodiment of the present disclosure provides a terminal device, including: a wireless communications module, a user input module, a processor, and a memory, where the wireless communications module is configured to support the terminal device in communicating with another terminal device on different types of communications networks; the user input module is configured to detect an input operation that is of initiating a call request to a second terminal device and that is input by a user; the memory is configured to store an instruction; and the processor is configured to invoke the instruction to: when the user input module detects the input operation, or when the terminal device receives a first call request that is initiated by the second terminal device by using a second-type communications network, detect whether both the terminal device and the second terminal device are in a first-type communications network; and when detecting that both the terminal device and the second terminal device are in the first-type communications network, initiate a second call request to the second terminal device by using the first-type communications network, where the first-type communications network is different from the second-type communications network.

The processor invokes the instruction stored in the memory, to implement the solution in the method design in the first aspect. For a problem resolving implementation of the terminal device and beneficial effects, refer to the first aspect and the possible implementations and the beneficial effects of the first aspect. Therefore, for implementation of the terminal device, refer to implementation of the method, and repeated parts are not described herein again.

According to a sixth aspect, an embodiment of the present disclosure provides a terminal device, including: a wireless communications module, a user input module, a processor, and a memory, where the wireless communications module is configured to support the terminal device in communicating with another terminal device on different types of communications networks; the user input module is configured to detect an input operation that is of initiating a call request to a second terminal device and that is input by a user; the memory is configured to store an instruction; and the processor is configured to invoke the instruction to: when the user input module detects the input operation, or when the terminal device receives a first call request that is initiated by the second terminal device by using a second-type communications network, detect whether both the terminal device and the second terminal device are in a first-type communications network; and when detecting that both the terminal device and the second terminal device are in the first-type communications network, send first prompt information to the second terminal device by using the wireless communications module, where the first prompt information is used to indicate that both the terminal device and the second terminal device are in the first-type communications network, and the first-type communications network is different from the second-type communications network.

The processor invokes the instruction stored in the memory, to implement the solution in the method design in the second aspect. For a problem resolving implementation of the terminal device and beneficial effects, refer to the second aspect and the possible implementations and the beneficial effects of the second aspect. Therefore, for implementation of the terminal device, refer to implementation of the method, and repeated parts are not described herein again.

According to a seventh aspect, an embodiment of the present disclosure provides a terminal device, including: a wireless communications module, a processor, a memory, and an audio/video input module, where the wireless communications module is configured to support the terminal device in communicating with another terminal device on different types of communications networks; the memory is configured to store an instruction; the processor is configured to invoke the instruction to: when the terminal device and a second terminal device make a video call by using a first-type communications network, determine whether signal quality of the first-type communications network meets a preset condition; when the signal quality of the first-type communications network does not meet the preset condition, initiate, by the first terminal device, a voice call request to the second terminal device by using a second-type communications network; and after the voice call request is responded, send and receive audio data of the video call by using the second-type communications network, and send and receive image data of the video call by using the first-type communications network, where the first-type communications network is different from the second-type communications network; and the audio/video input module is configured to obtain the audio data and the image data.

The processor invokes the instruction stored in the memory, to implement the solution in the method design in the third aspect. For a problem resolving implementation of the terminal device and beneficial effects, refer to the third aspect and the possible implementations and the beneficial effects of the third aspect. Therefore, for implementation of the terminal device, refer to implementation of the method, and repeated parts are not described herein again.

According to an eighth aspect, an embodiment of the present disclosure provides a terminal device, including: a wireless communications module, a processor, a memory, and an audio/video input module, where the wireless communications module is configured to support the terminal device in communicating with another terminal device on different types of communications networks; the memory is configured to store an instruction; the processor is configured to invoke the instruction to: when the terminal device and a second terminal device make a voice call by using a second-type communications network, establish a video call with the second terminal device by using the first-type communications network; determine whether signal quality of the first-type communications network meets a preset condition; and when the signal quality of the first-type communications network does not meet the preset condition, send and receive audio data of the video call by using the second-type communications network, and send and receive image data of the video call by using the first-type communications network, where the first-type communications network is different from the second-type communications network; and the audio/video input module is configured to obtain the audio data and the video data.

The processor invokes the instruction stored in the memory, to implement the solution in the method design in the fourth aspect. For a problem resolving implementation of the terminal device and beneficial effects, refer to the fourth aspect and the possible implementations and the beneficial effects of the fourth aspect. Therefore, for implementation of the terminal device, refer to implementation of the method, and repeated parts are not described herein again.

According to a ninth aspect, an embodiment of the present disclosure provides a terminal device, where the terminal device includes functional modules configured to perform the method in any possible implementation of the first aspect to the fourth aspect.

Based on a same inventive concept, for a problem resolving principle of the apparatus and beneficial effects, refer to the implementation of the method in any possible implementation of the first aspect to the fourth aspect and the brought beneficial effects. Therefore, for implementation of the apparatus, refer to implementation of the method in any possible implementation of the first aspect to the fourth aspect, and repeated parts are not described herein again.

According to a tenth aspect, an embodiment of the present disclosure provides a non-volatile computer storage medium, where the non-volatile computer storage medium stores program code, and the program code includes an instruction used to perform the method in any possible implementation of the first aspect to the fourth aspect.

DETAILED DESCRIPTION OF ILLUSTRATIVE EMBODIMENTS

Figure 1:
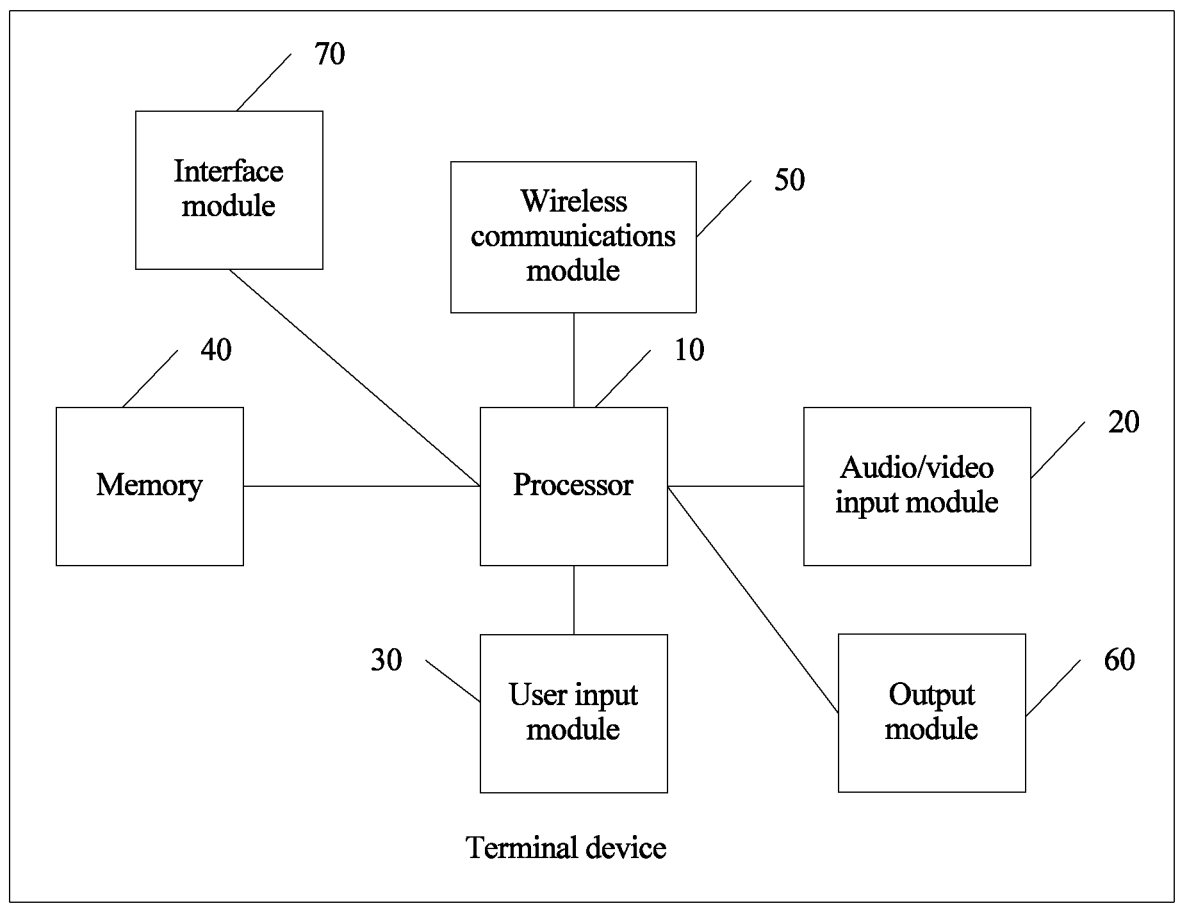
FIG. 1 is a structural diagram of a terminal device according to an embodiment of the present disclosure.

Embodiments of the present disclosure provide a call switching method, a terminal device, and a storage medium, to resolve a prior-art technical problem that call network selection is not flexible enough because a user manually selects a call network.

To make the objectives, technical solutions, and advantages of the embodiments of the present disclosure clearer, the following describes the technical solutions of the embodiments of the present disclosure with reference to the accompanying drawings in some embodiments of the present disclosure.

It should be understood that the specific embodiments described herein are merely used to explain the present disclosure but are not intended to limit the present disclosure.

The call switching method in some embodiments of the present disclosure is mainly applied to a terminal device. The terminal device implementing the embodiments of the present disclosure is described with reference to the accompanying drawings. In the subsequent descriptions, a suffix such as "module", "component", or "unit" used to represent an element is merely used to facilitate description of the present disclosure, and does not have specific meanings. Therefore, the "module" and "component" can be interchanged with each other.

For a first terminal device and a second terminal device that are described in this specification, "first" and "second" are merely used to indicate that a call is made between at least two terminal devices. Therefore, "first" and "second" are merely used to distinguish between the two terminal devices, and do not have specific meanings.

During actual application, the first terminal device and the second terminal device may be implemented in various forms. For example, the first terminal device and the second terminal device may be wireless terminal devices or may be wired terminal devices. The wireless terminal device may be a device that provides voice and/or other service data connectivity for a user, a handheld device having a wireless connection function, or another processing device connected to a wireless modem. The wireless terminal device may communicate with one or more core networks by using a radio access network (RAN for short). The wireless terminal device may be a mobile terminal such as a mobile phone (also referred to as a "cellular" phone) or a computer having a mobile terminal. For example, the wireless terminal device may be a portable, pocket-sized, handheld, computer built-in, or in-vehicle mobile apparatus that exchanges a voice and/or data with the radio access network. For example, the wireless terminal device may be a device such as a personal communications service (PCS for short) phone, a cordless phone, a Session Initiation Protocol (SIP for short) telephone set, a wireless local loop (WLL for short) station, or a personal digital assistant (PDA for short). The wireless terminal device may be also referred to as a system, a subscriber unit, a subscriber station, a mobile station, a mobile, a remote station, a remote terminal, an access terminal, a user terminal, a user agent, or user equipment.

The first terminal device and the second terminal device may be terminal devices of a same type, for example, both are mobile phones; or may be terminal devices of different types, for example, the first terminal device is a mobile phone, and the second terminal device is a tablet computer.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

FIG. 1 is a structural diagram of a terminal device according to an embodiment of the present disclosure. As shown in FIG. 1, FIG. 1 is a schematic structural diagram of hardware of a first terminal device and a second terminal device in some embodiments according to an embodiment of the present disclosure.

The terminal device includes a processor 10, an audio/video input module 20, a user input module 30, a memory 40, a wireless communications module 50, an output module 60, and an interface module 70. FIG. 1 shows the terminal device having the various components. However, it should be understood that not all shown components need to be implemented. Alternatively, more or fewer components may be implemented. In addition, the components may be of a bus structure, or may be of another structure such as a star structure. This is not specifically limited in the present disclosure.

Optionally, the processor 10 may be a general-purpose central processing unit or an application-specific integrated circuit (ASIC for short), or may be one or more integrated circuits configured to control program execution, or may be a hardware circuit that is developed by using a field programmable gate array (FPGA for short).

Optionally, the processor 10 usually controls an overall operation of the terminal device. For example, the processor 10 executes control and processing related to a voice call, data communication, a video call, or the like.

Optionally, the audio/video input module 20 is configured to receive an audio signal or a video signal. The audio/video input module 30 may include a camera and a microphone. The camera processes image data of a still image or a video that is obtained by an image capturing apparatus in a video capturing mode or an image capturing mode. A processed image frame may be displayed on a monitor in the output module 60. Alternatively, the image frame processed by the camera may be stored in the memory 40 (or another storage medium), and is sent by using the wireless communications module 50. At least two cameras may be provided according to composition of the terminal device. The microphone may receive a voice by using the microphone in an operation mode such as a call mode or a record mode, and can process the voice as audio data. The processed audio data may be converted, in a call mode, into a format that can be sent by using the wireless communications module, and the format is output. The microphone may implement various types of noise elimination (or suppression) algorithms to eliminate (or suppress) noise or interference that is generated in a process of receiving and sending audio data.

The user input module 30 may generate key input data according to a command entered by a user, to control various operations of the terminal device. The user input module 30 allows the user to enter various types of information, and may include one or more of a keyboard, a touchpad, a scroll wheel, or a joystick. When the touchpad is stacked on the monitor in a form of a layer, a touchscreen may be formed.

The memory 40 may store a software program that is executed by the processor 10 to process and control an operation, and the like; or may store, in a nibbling manner, data that has been output or that is to be output (such as an address book, a message, a still image, or a video). The memory 40 may further store data related to vibration signals and audio signals in various forms that are output when a touch is imposed onto the touchscreen.

The memory 40 may include one or more of a read-only memory (ROM for short), a random access memory (RAM for short), or a magnetic disk storage. There are one or more memories 40.

The wireless communications module 50 usually includes one or more components, and allows wireless communication between the terminal device and a wireless communications system or network. For example, the wireless communications module 50 may include a mobile communications module, a wireless Internet module, a short-distance communications module, and a broadcast receiving module.

The broadcast receiving module receives a broadcast signal and/or broadcast-related information from an external broadcast management server by using a broadcast channel. The broadcast-related information may be provided by using a mobile communications network, and in this case, the broadcast-related information may be received by using the mobile communications module.

The mobile communications module sends a radio signal to at least one of a base station, an external terminal, or a server, and/or receives a radio signal from at least one of a base station, an external terminal, or a server. The radio signal may include a voice call signal, a video call signal, or various types of data that is sent and/or received according to a text message and/or a multimedia message.

The base station described in this specification may be a base transceiver station (BTS for short) in the GSM or CDMA, or may be a NodeB (NB for short) in Wideband Code Division Multiple Access (WCDMA for short), or may be an evolved NodeB (eNB or eNodeB for short) in LTE, a relay station or an access station, a base station in a future 5G network, or the like.

The wireless Internet module supports wireless Internet access of the mobile terminal. The module may be internally or externally coupled to the terminal device. A wireless Internet access technology used by the module may include a wireless local area network (WLAN for short) (WiFi), a wireless broadband, Worldwide Interoperability for Microwave Access (Wimax), and the like.

The short-distance communications module is a module supporting short-distance communication. Some examples of a short-distance communications technology include Bluetooth, radio frequency, infrared, an ultra-wideband, and the like.

The output module 60 may include the monitor and an audio output unit. The monitor may display information processed in the terminal device. For example, when the terminal device is in a call mode, the monitor may display a user interface (UI for short) or a graphical user interface (GUI for short) related to a call or other information (such as text information sending and receiving or multimedia file downloading). When the terminal device is in a video call mode or an image capturing mode, the monitor may display a captured image and/or a received image, a UI or GUI that displays a video or an image and a related function, and the like.

Further, when the monitor and the touchpad are mutually stacked in a form of a layer to form the touchscreen, the monitor may be used as an input apparatus and an output apparatus. The touchscreen may be configured to detect touch input pressure, a touch input location, and a touch input area.

When the terminal device is in a mode such as a call signal receiving mode, a call mode, or an illustrative sentence mode, the audio output module may convert, into an audio signal, audio data received by the wireless communications module 50 or audio data stored in the memory 40, and output the audio signal as a voice. Further, the audio output module may provide audio output (such as a call signal received voice or a message received voice) related to a specific function implemented by the terminal device. The audio output module may include a loudspeaker, a buzzer, or the like.

The interface module 70 is used as an interface that can be used to connect at least one external apparatus and the terminal device. For example, the external apparatus may include one or more of a wired or wireless headphone port, an external power supply (or a battery charger) port, a wired or wireless data port, a storage card port, a port used to connect to an apparatus having an identity module, an audio input/output port, a video input/output port, or a headset port. The identity module may store various types of information used to verify the terminal device used by the user, and may include one or more of a user identity module (UIM for short), a SIM, or a universal SIM (USIM).

Figure 2:
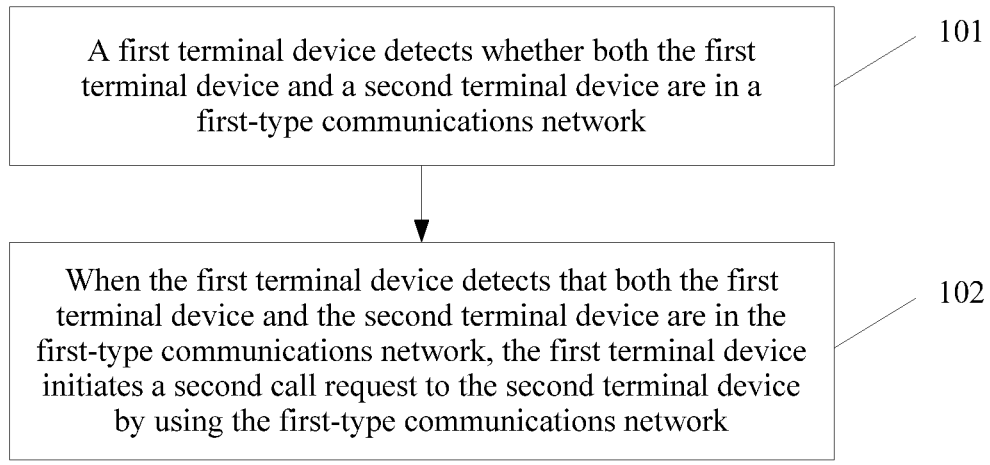
FIG. 2 is a flowchart of a first call switching method according to an embodiment of the present disclosure.

FIG. 2 is a flowchart of a first call switching method according to an embodiment of the present disclosure. As shown in FIG. 2, FIG. 2 is a flowchart of a call switching method according to an embodiment of the present disclosure. As shown in FIG. 2, the method includes the following steps:

Step 101. When a first terminal device detects an input operation that is of initiating a call request to a second terminal device and that is input by a user, or when a first terminal device receives a first call request that is initiated by a second terminal device by using a second-type communications network, the first terminal device detects whether both the first terminal device and the second terminal device are in a first-type communications network.

Step 102. When the first terminal device detects that both the first terminal device and the second terminal device are in the first-type communications network, the first terminal device initiates a second call request to the second terminal device by using the first-type communications network, where the first-type communications network is different from the second-type communications network.

During actual application, the first terminal device may be a calling device, and correspondingly, the second terminal device is a called device. On the contrary, the first terminal device may be a called device, and correspondingly, the second terminal device is a calling device.

When the first terminal device is a calling device, before step 101, the method further includes: detecting, by the first terminal device, whether there is an input operation that is of initiating a call request to the second terminal device and that is input by the user. Optionally, the input operation is an input operation that a call request needs to be initiated to the second terminal device by using the second-type communications network. For example, the user selects a mobile number corresponding to the second terminal device, and presses a dial key. In this case, the first terminal device may detect the dial operation. Certainly, the user may input a dial operation on a call interface of the second-type communications network such as WiFi. In this case, the first terminal device may also detect the dial operation.

When the first terminal device is a called device, before step 101, the method further includes: receiving, by the first terminal device, the first call request that is initiated by the second terminal device.

Optionally, the second-type communications network is, for example, the GSM or CDMA (also referred to as a 2G network). Correspondingly, the first call request is initiated or received by using a mobile communications module corresponding to the GSM or CDMA.

Optionally, the first-type communications network is, for example, an LTE network (also referred to as a 4G network) or a WiFi network.

During actual application, step 101 may be implemented in multiple manners. One implementation is as follows: The first terminal device determines that the first terminal device is in the first-type communications network; the first terminal device sends a query request to a server, where the query request is used to query for a network type of a communications network to which the second terminal device is currently connected, and the server records the network type of the communications network to which the second terminal device is currently connected; the first terminal device receives a query result sent by the server, where the query result includes the network type of the communications network to which the second terminal device is currently connected; and the first terminal device detects, according to the query result, whether both the first terminal device and the second terminal device are in the first-type communications network.

Specifically, the server may be added to an existing network. The terminal device may periodically report a network type of a communications network to which the first terminal device is connected, or report, when a network type of a connected communications network changes, the network type of the communications network to which the first terminal device is connected. Further, signal quality of the network may be reported. The server saves and updates a network type of a communications network to which each terminal device is currently connected, and further saves signal quality of the communications network. Therefore, the first terminal device may send, to the server, the query request used to query for the network type of the communications network to which the second terminal device is currently connected. Optionally, the query request may include a device identifier of the second terminal device, an account registered by the second terminal device in the server, or a mobile number, provided that the identifier, account, or mobile number is unique. The device identifier is, for example, an international mobile equipment identity (IMEI for short) or a mobile equipment identifier (MEID for short). The device identifier, mobile number, or account may be collectively referred to as a unique identifier of the terminal device.

After receiving the query request sent by the first terminal device, the server may find, according to the unique identifier of the second terminal device, the network type of the communications network to which the second terminal device is currently connected, such as 2G, WiFi, or 4G. After finding the network type, the server sends the query result to the first terminal device. Correspondingly, the first terminal device receives the query result, and detects, according to the query result, whether the second terminal device is also in the first-type communications network.

For example, it is assumed that the first-type communications network is a WiFi network, and the second-type communications network is a 2G network. Communications networks to which the first terminal device is currently connected are the 2G network and WiFi. In addition, the query result indicates that communications networks to which the second terminal device is currently connected are the 2G network and the WiFi network. Therefore, the first terminal device can determine that both the first terminal device and the second terminal device are in the WiFi network.

When the first terminal device is a calling device, another possible implementation of step 101 is as follows: The first terminal device receives second prompt information sent by the second terminal device, where the second prompt information includes a network type of a communications network to which the second terminal device is currently connected; and the first terminal device detects, according to a network type of a communications network to which the first terminal device is currently connected and the second prompt information, whether both the first terminal device and the second terminal device are in the first-type communications network.

Optionally, the second terminal device may send the prompt information to the first terminal device in a browser/server mode (B/S for short) or a client/browser mode (C/S for short). Certainly, during actual application, the prompt information may be sent in another manner, for example, by using a short messaging service message.

For example, when the first terminal device calls the second terminal device, when receiving the call request, the second terminal device may send, to the first terminal device, the prompt information including the network type of the communications network to which the first terminal device is currently connected. For example, the prompt information includes a WiFi network, and then, the first terminal device determines, according to the WiFi network in the prompt information and WiFi to which the first terminal device is currently connected, that both the first terminal device and the second terminal device are in WiFi.

When the first terminal device is a calling device, still another possible implementation of step 101 is as follows: The first terminal device receives third prompt information sent by the second terminal device, where the third prompt information is used to indicate whether both the first terminal device and the second terminal device are in the first-type communications network; and the first terminal device determines, according to the third prompt information, whether both the first terminal device and the second terminal device are in the first-type communications network.

For example, when the first terminal device calls the second terminal device, when detecting the call request, the second terminal device queries a server for a network type of a communications network to which the first terminal device is currently connected, and then, determines, according to the network type of the communications network to which the first terminal device is currently connected and a network type of a communications network to which the first terminal device is currently connected, whether both the first terminal device and the second terminal device are in the first-type communications network. For example, a result of querying the server is that the communications network to which the first terminal device is currently connected is a 4G network, and the communications network to which the second terminal device is currently connected is WiFi. Therefore, a determining result of the second terminal device is that not both the first terminal device and the second terminal device are in the first-type communications network. If a result of querying the server is that the communications network to which the first terminal device is currently connected is also WiFi, a determining result of the second terminal device is that both the first terminal device and the second terminal device are in the WiFi network, that is, both the first terminal device and the second terminal device are in the first-type communications network. Then, the second terminal device sends the determining result of the second terminal device, that is, the prompt information, to the first terminal device.

When a detection result in step 101 is that both the first terminal device and the second terminal device are in the first-type communications network, next, step 102 of initiating the second call request to the second terminal device by using the first-type communications network is performed.

Further, if the first terminal device detects that both the first terminal device and the second terminal device are in the first-type communications network, the first terminal device further abandons the first call request that is initiated by the second terminal device to the first terminal device by using the second-type communications network. That the first call request is abandoned means that the current call request is rejected or cut off.

For example, when a first user dials a mobile number 139XXXXXXXX on the first terminal device, the first terminal device performs step 101. When the detection result in step 101 is that both the first terminal device and the second terminal device are in WiFi, the first terminal device initiates a WiFi call request.

For another example, when the first terminal device receives a call made by a second terminal device whose mobile number is 139XXXXXXXX, the first terminal device performs step 101. When the detection result in step 101 is that both the first terminal device and the second terminal device are in WiFi, the first terminal device cuts off the call and initiates a WiFi call request.

Optionally, a call interface may be displayed on the monitor included in the output module 60.

Optionally, when the detection result in step 101 is that not both the first terminal device and the second terminal device are in the first-type communications network, a third call request is initiated to the second terminal device by using the second-type communications network.

It should be noted that a WiFi call may be a mobile number or another ID. If an operator WiFi network is used, communication is usually performed by using a mobile number. If a non-operator WiFi network is used, another ID is usually used to indicate an identity of the user. The ID is globally unique, and is, for example, the foregoing device identifier or account. In addition, the identity ID of the user is recorded on a network server. There is a heartbeat mechanism for both an operator and a non-operator. The terminal device may notify the network server of an on-net status of the first terminal device at a specific frequency, so that the network server can accurately switch a call network, and a case in which a calling end and a called end are different may not occur.

In a possible implementation, the first terminal device has a first account and a second account, and the second terminal device has a third account and a fourth account. The first account is associated with the second account, and the third account is associated with the fourth account. The first account and the third account may establish a call request by using the second-type communications network. The second account and the fourth account may establish a call request by using the first-type communications network. For example, the first account and the second account are mobile numbers, the third account is a unique identifier of the first terminal device, and the fourth account is a unique identifier of the second terminal device.

As can be learned from the foregoing descriptions, in the method in this embodiment of the present disclosure, the terminal device automatically determines network types of communications networks to which a calling party and a called party are connected, and then automatically selects a call network. Compared with manual call network selection in the prior art, the method in this embodiment of the present disclosure has more flexible technical effects. For example, the user may set the first-type communications network as a WiFi network, and set the second-type communications network as a 2G network. Because call tariffs of the 2G network are relatively high, and the WiFi network is usually a free network or tariffs of the WiFi network are usually relatively low, when it is detected that the user is making a 2G call, it is detected whether both the calling end and the called end are in the WiFi network. If both the calling end and the called end are in the WiFi network, a call network is switched to the WiFi network. In this way, switching may be flexibly performed between different call networks to reduce tariffs.

Further, to ensure call quality in the first-type communications network, before step 102, the method further includes: determining, by the first terminal device, that signal quality of the first-type communications network meets a preset condition. The signal quality may be represented by using multiple parameters such as bandwidth, a data transmission rate, a signal-to-noise ratio, a packet loss rate, and signal strength. If the signal quality is the bandwidth, the first terminal device determines whether bandwidth of the first-type communications network is greater than or equal to preset bandwidth. If the signal quality is the data transmission rate, the first terminal device determines whether a current data transmission rate is greater than or equal to a preset transmission rate. If the signal quality is the signal-to-noise ratio, the first terminal device determines whether a current signal-to-noise ratio is greater than or equal to a preset signal-to-noise ratio. If the signal quality is the signal strength, the first terminal device determines whether current signal strength is greater than or equal to a preset signal-to-noise ratio. Therefore, preset conditions are different according to different parameters.

By means of the method, call quality is ensured and user experience is satisfied as far as possible. Therefore, user experience is relatively good.

It should be noted that the first terminal device obtains different signal quality of communications networks according to different network types. However, regardless of which network, obtaining signal quality is content well known to a person skilled in the art. For example, obtaining signal quality of a WiFi network may be obtaining signal strength or bandwidth of WiFi, or may be calculating a network transmission rate. Therefore, details are not described herein.

In addition, it should be noted that determining that the signal quality of the first-type communications network meets the preset condition includes: determining signal quality of the first-type communications network on a first terminal device side and/or signal quality of the first-type communications network on a second terminal device side meet/meets the preset condition.

For determining that the signal quality of the first-type communications network on the second terminal device side meets the preset condition, in the foregoing descriptions, when each terminal device reports a type of a connected communications network to a server, the terminal device may further report signal quality of the communications network. Therefore, the first terminal device may separately request, from the server, the signal quality of the first-type communications network on the second terminal device side, or the server may add the signal quality to a detection result and deliver the detection result to the first terminal device.

When the first terminal device is a called device, in addition to the method described above, the following implementation may be further used for implementation.

Figure 3:
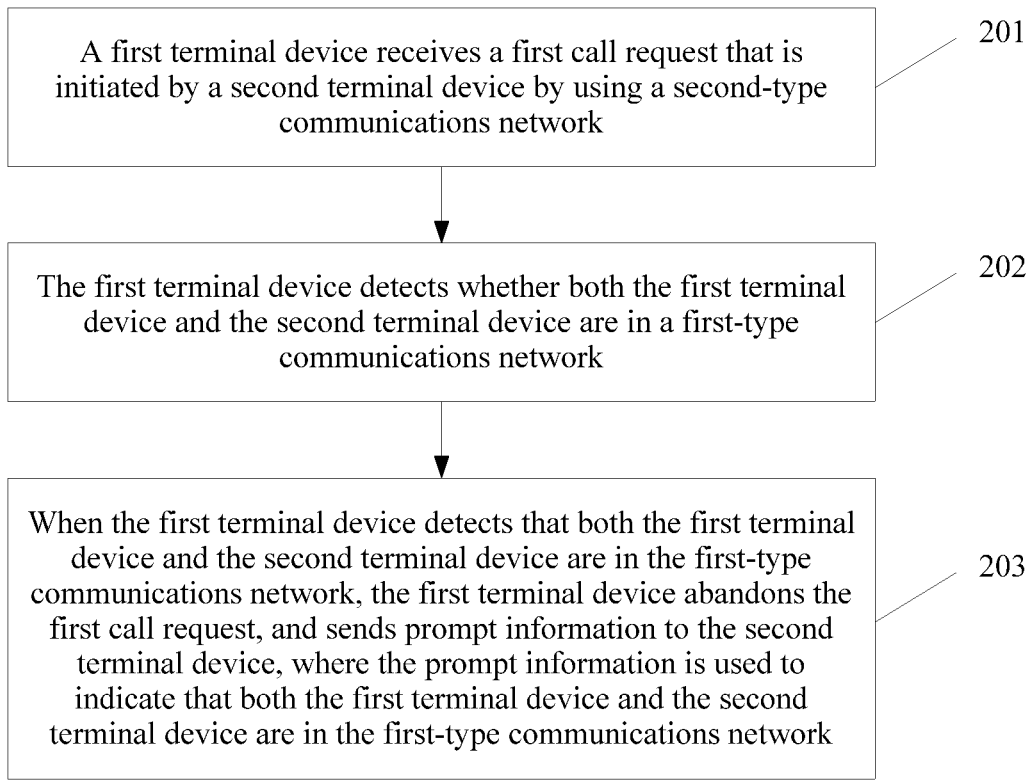
FIG. 3 is a flowchart of a second call switching method according to an embodiment of the present disclosure.

FIG. 3 is a flowchart of a second call switching method according to an embodiment of the present disclosure. As shown in FIG. 3, the method includes the following steps.

Step 201. A first terminal device receives a first call request that is initiated by a second terminal device by using a second-type communications network.

Step 203. When both the first terminal device and the second terminal device are in the first-type communications network, the first terminal device abandons the first call request, and sends first prompt information to the second terminal device, where the first prompt information is used to indicate that both the first terminal device and the second terminal device are in the first-type communications network, and the first-type communications network is different from the second-type communications network.

Step 202. The first terminal device detects whether both the first terminal device and the second terminal device are in a first-type communications network.

Step 201, step 202, and the part of abandoning the first call request in step 203 are the same as or similar to the foregoing descriptions, and therefore, details are not described herein again.

As can be learned from the foregoing descriptions, in this embodiment of the present disclosure, the first terminal device automatically detects network statuses of a calling device and a called device, and sends, to a peer terminal device, prompt information indicating that a call network can be switched, so that the peer terminal device can directly switch a call network based on the prompt. Therefore, a step of detecting the network by the peer terminal device is saved, and switching time is reduced.

It should be noted that in step 203, the first terminal device sends, to the second terminal device, the prompt information used to indicate that both the first terminal device and the second terminal device are in the first-type communications network. For example, the prompt information may be sent in a B/S mode or a C/S mode.

After receiving the prompt information, the second terminal device may directly initiate a call request on the first-type communications network.

Although the foregoing describes a case in which the first terminal device is a called device, the method shown in FIG. 2 is also applicable to a case in which the first terminal device is a calling device. For example, when the foregoing input operation is detected, step 202 and step 203 may be also performed.

That is, in this embodiment, when a called device detects that both the called device and a calling device are in the first-type communications network, the called device may actively cut off a received call request. However, the called device may not actively initiate a call request on the first-type communications network but send a detection result to the calling device. The calling device may determine, based on the detection result, whether to initiate a call request on the first-type communications network.

Similarly, to ensure call quality, after step 202 and before step 203, the method further includes: determining, by the first terminal device, that signal quality of the first-type communications network meets a preset condition. For a specific implementation of this step, refer to the content described above.

In the call switching methods in FIG. 2 and FIG. 3, the call request may be a voice call request or may be a video call request. If the call request is the video call request, the first-type communications network may be a WiFi network, and the second-type communications network may be a 4G network.

In addition, it should be noted that the first-type communications network and the second-type communications network in this specification may be future 5G networks or other networks, and any communications network that can implement a voice call or a video call is applicable to the method in this embodiment of the present disclosure.

The foregoing describes a case in which the terminal device may automatically select or switch a voice call network or a video call network. The following describes a case in which during a video call, voice data and image data of the video call may be transmitted on different networks or a same network according to signal quality of a communications network. The following describes this part of content in detail.

Figure 4:
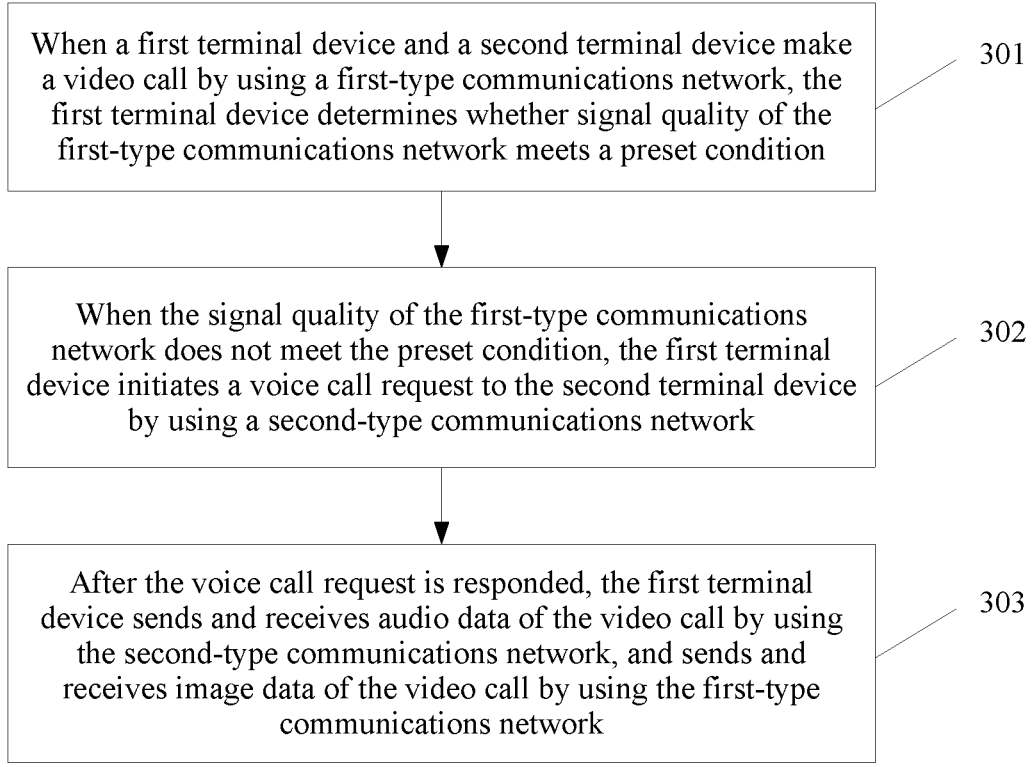
FIG. 4 is a flowchart of a third call switching method according to an embodiment of the present disclosure.

FIG. 4 is a flowchart of a third call switching method according to an embodiment of the present disclosure. As shown in FIG. 4, FIG. 4 is a flowchart of another call switching method according to an embodiment of the present disclosure. The method includes the following steps:

Step 301. When a first terminal device and a second terminal device make a video call by using a first-type communications network, the first terminal device determines whether signal quality of the first-type communications network meets a preset condition.

Step 302. When the signal quality of the first-type communications network does not meet the preset condition, the first terminal device initiates a voice call request to the second terminal device by using a second-type communications network.

Step 303. After the voice call request is responded, the first terminal device sends and receives audio data of the video call by using the second-type communications network, and sends and receives image data of the video call by using the first-type communications network, where the first-type communications network is different from the second-type communications network.

During actual application, the video call may be initiated by the first terminal device, or may be initiated by the second terminal device.

In step 301, the first terminal device determines whether the signal quality of the first-type communications network meets the preset condition. A specific implementation process is similar to the implementation process described above, and therefore, details are not described herein again.

When the signal quality of the first-type communications network does not meet the preset condition, it indicates that current communication quality of the first-type communications network is not good enough. Therefore, the first terminal device initiates the voice call request to the second terminal device by using the second-type communications network. After the voice call request is responded, the image data of the video call may be sent and received by using the first-type communications network, and the audio data of the video call may be sent and received by using the second-type communications network. Therefore, the audio data and the image data are separately transmitted on the different networks, and then voice call quality and image transmission quality can be ensured as far as possible.

For example, the first terminal device and the second terminal device make a video call by using a 4G network. In this case, both audio data and image data of the video call are transmitted by using the 4G network. The first terminal device detects whether signal quality of the 4G network is relatively good. If a detection result is that the signal quality of the 4G network is not good enough, for example, signal strength is relatively weak or a transmission rate is relatively low, video call freeze may be caused. Therefore, in this case, the first terminal device initiates a 2G voice call to the second terminal device. After the second terminal device responds to the voice call request, the first terminal device and the second terminal device may transmit the audio data by using a 2G network, and transmit the image data by using the 4G network. That is, the video call is implemented by using the two networks, to ensure communication quality.

Optionally, after step 103, the method further includes: determining, by the first terminal device, whether the signal quality of the first-type communications network meets the preset condition; and when the signal quality of the first-type communications network meets the preset condition, abandoning, by the first terminal device, a voice call that is initiated by using the second-type communications network, and sending and receiving the audio data and the image data of the video call by using the first-type communications network.

The foregoing example is still used for description. After the audio data is transmitted by using the 2G network and the image is transmitted by using the 4G network, the first terminal device may further detect, in real time, whether the signal quality of the 4G network becomes better. After the signal quality becomes better, the first terminal device may cut off the 2G voice call, and continue to transmit the voice and the image by using the 4G network.

Optionally, the audio data may be added to the image data. For example, a Moving Picture Experts Group (MPEG for short)-4 compression coding standard is used to perform compression coding on the audio data and the image data, and then compressed audio/video data is transmitted by using the 4G network. During actual application, another compression coding standard such as H.246 or audio video interleaving (AVI for short) may be used to add the audio data to the image data. This part of content is content well known to a person skilled in the art, and therefore, details are not described herein.

The foregoing describes a process in which during a video call, audio data and image data of the video call are separately transmitted according to signal quality of a video call bearer network. The following describes a call switching method used when a video call is initiated in a voice call process.

Figure 5:
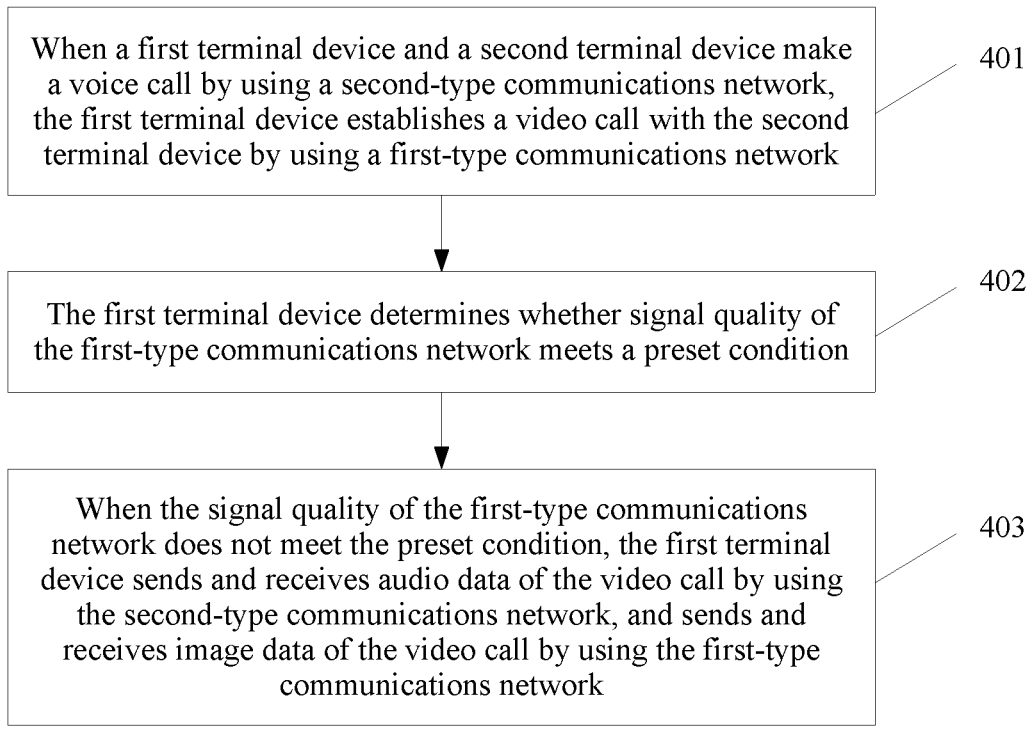
FIG. 5 is a flowchart of a fourth call switching method according to an embodiment of the present disclosure.

FIG. 5 is a flowchart of a fourth call switching method according to an embodiment of the present disclosure. As shown in FIG. 5, the method includes the following steps:

Step 401. When a first terminal device and a second terminal device make a voice call by using a second-type communications network, the first terminal device establishes a video call with the second terminal device by using a first-type communications network.

Step 402. The first terminal device determines whether signal quality of the first-type communications network meets a preset condition.

Step 403. When the signal quality of the first-type communications network does not meet the preset condition, the first terminal device sends and receives audio data of the video call by using the second-type communications network, and sends and receives image data of the video call by using the first-type communications network, where the first-type communications network is different from the second-type communications network.

In this embodiment, when the first terminal device and the second terminal device make the voice call by using the second-type communications network, for example, make the voice call by using a 2G network, the first terminal device or the second terminal device initiates a video call request by using the first-type communications network. After the video call request is responded, the first terminal device and the second terminal device establish the video call, for example, establish the video call by using WiFi. That is, the first terminal device and the second terminal device establish the voice call and the video call on the two different networks at a same moment.

In this case, the first terminal device may perform step 402, that is, determine whether the signal quality of the first-type communications network meets the preset condition. That is, it is determined whether the signal quality of the first-type communications network is relatively good, for example, it is determined whether signal quality of the WiFi network is good. For a specific determining manner, refer to the foregoing descriptions.

When the signal quality does not meet the preset condition, that is, the signal quality is not good enough, the audio data of the video call is allocated to the second-type communications network for transmission, and only the image data of the video call is transmitted on the first-type communications network. In this way, voice quality and image quality can be ensured as far as possible.

For example, when the signal quality of the WiFi network is not good enough, the audio data is transmitted by using the 2G network, and only the image data is transmitted on the WiFi network.

Optionally, after step 403 or step 402, the method further includes: determining, by the first terminal device, whether the signal quality meets the preset condition; and when the signal quality meets the preset condition, abandoning, by the first terminal device, the voice call on the second-type communications network, and sending and receiving the audio data and the image data of the video call by using the first-type communications network.

For example, if it is detected that the signal quality of the WiFi network is good, voice communication on the 2G network is cut off, and the audio data and the image data are transmitted by using the WiFi network. In this way, while call quality is ensured, tariffs of the voice call on the 2G network can be reduced and power consumption of the terminal device can be reduced.

As can be learned from the description of the call switching methods shown in FIG. 4 and FIG. 5, in the two embodiments, it may be determined, according to signal quality of a video call, whether to separately transmit audio data and image data of the video call on two different networks. In this way, video call quality can be ensured. Further, when the signal quality of the video call becomes better, the audio data and the image data may be combined again, and the audio data and the image data are transmitted by using a video call network. In this way, power consumption of the terminal device can be reduced while call quality is ensured.

Based on a same inventive concept, an embodiment of the present disclosure further provides a terminal device, and a structure of the terminal device is, for example, shown in FIG. 1, to implement any call switching method shown in FIG. 2 to FIG. 4. During actual application, the terminal device may be configured according to an actual requirement.

Optionally, when the terminal device is configured to implement the call switching methods shown in FIG. 2 and FIG. 3, specifically, the wireless communications module 50 is configured to support the terminal device in communicating with another terminal device on different types of communications networks; the user input module 30 is configured to detect an input operation that is of initiating a call request to a second terminal device and that is input by a user; the memory 40 is configured to store an instruction; and the processor 10 is configured to invoke the instruction to: when the user input module 30 detects the input operation, or when the terminal device receives a first call request that is initiated by the second terminal device by using a second-type communications network, detect whether both the terminal device and the second terminal device are in a first-type communications network; and when detecting that both the terminal device and the second terminal device are in the first-type communications network, initiate a second call request to the second terminal device by using the first-type communications network, or send first prompt information to the second terminal device by using the wireless communications module, where the first prompt information is used to indicate that both the first terminal device and the second terminal device are in the first-type communications network, and the first-type communications network is different from the second-type communications network.

Optionally, the processor 10 is further configured to invoke the instruction to: when detecting that not both the terminal device and the second terminal device are in the first-type communications network, initiate a third call request to the second terminal device by using the second-type communications network.

Optionally, the processor 10 is further configured to invoke the instruction to reject the first call request when detecting that both the terminal device and the second terminal device are in the first-type communications network.

Optionally, the processor 10 is further configured to invoke the instruction to: before initiating the second call request to the second terminal device by using the first-type communications network, determine that signal quality of the first-type communications network meets a preset condition.

Optionally, the processor 10 is configured to invoke the instruction to: determine that the terminal device is in the first-type communications network; send a query request to a server by using the wireless communications module 50, where the query request is used to request to query for a network type of a communications network to which the second terminal device is currently connected, and the server records the network type of the communications network to which the second terminal device is currently connected; receive, by using the wireless communications module 50, a query result sent by the server, where the query result includes the network type of the communications network to which the second terminal device is currently connected;

and detect, according to the query result, whether both the terminal device and the second terminal device are in the first-type communications network.

Optionally, the processor 10 is configured to invoke the instruction to: receive, by using the wireless communications module 50, second prompt information sent by the second terminal device, where the second prompt information includes a network type of a communications network to which the second terminal device is currently connected; and detect, according to a network type of a communications network to which the terminal device is currently connected and the second prompt information, whether both the terminal device and the second terminal device are in the first-type communications network.

Optionally, the processor 10 is configured to invoke the instruction to: receive, by using the wireless communications module 50, third prompt information sent by the second terminal device, where the third prompt information is used to indicate whether both the terminal device and the second terminal device are in the first-type communications network; and determine, according to the prompt information, whether both the terminal device and the second terminal device are in the first-type communications network.

Optionally, the processor 10 is further configured to invoke the instruction to: when the second call request is a video call request, after the second call request is responded, determine whether signal quality of the first-type communications network meets a preset condition; when the signal quality does not meet the preset condition, initiate a voice call request to the second terminal device by using the second-type communications network; and after the voice call request is responded, send and receive audio data of a video call by using the second-type communications network, and send and receive image data of the video call by using the first-type communications network.

Optionally, the processor 10 is further configured to: after the voice call request is responded, determine whether the signal quality of the first-type communications network meets the preset condition; and when the signal quality of the first-type communications network meets the preset condition, cancel a voice call that is initiated by using the second-type communications network, and send and receive the audio data and the image data of the video call by using the first-type communications network.

Optionally, when the terminal device is configured to implement the call switching method shown in FIG. 4, the wireless communications module 50 is configured to support the terminal device in communicating with another terminal device on different types of communications networks; the memory 40 is configured to store an instruction; the processor 10 is configured to invoke the instruction to: when the terminal device and a second terminal device make a video call by using a first-type communications network, determine whether signal quality of the first-type communications network meets a preset condition; when the signal quality does not meet the preset condition, initiate, by the first terminal device, a voice call request to the second terminal device by using a second-type communications network; and after the voice call request is responded, send and receive audio data of the video call by using the second-type communications network, and send and receive image data of the video call by using the first-type communications network, where the first-type communications network is different from the second-type communications network; and the audio/video input module 20 is configured to obtain the audio data and the image data.

Optionally, the processor 10 is further configured to invoke the instruction to: after the voice call request is responded, determine whether the signal quality of the first-type communications network meets the preset condition; and when the signal quality of the first-type communications network meets the preset condition, cancel a voice call that is initiated by using the second-type communications network, and send and receive the audio data and the image data of the video call by using the first-type communications network.

Optionally, when the terminal device is configured to implement the call switching method shown in FIG. 5, the wireless communications module 50 is configured to support the terminal device in communicating with another terminal device on different types of communications networks; the memory 40 is configured to store an instruction; the processor 10 is configured to invoke the instruction to: when the terminal device and a second terminal device make a voice call by using a second-type communications network, establish a video call with the second terminal device by using a first-type communications network; determine whether signal quality of the first-type communications network meets a preset condition; when the signal quality of the first-type communications network does not meet the preset condition, send and receive audio data of the video call by using the second-type communications network, and send and receive image data of the video call by using the first-type communications network, where the first-type communications network is different from the second-type communications network; and the audio/video input module 20 is configured to obtain the audio data and the video data.

Optionally, the processor 10 is further configured to invoke the instruction to: determine whether the signal quality of the first-type communications network meets the preset condition; and when the signal quality of the first-type communications network meets the preset condition, cancel the voice call that is initiated by using the second-type communications network, and send and receive the audio data and the image data of the video call by using the first-type communications network.

Various variations and specific instances in the call switching methods in some embodiments in FIG. 2 and FIG. 4 are also applicable to the terminal device in this embodiment. According to the foregoing detailed descriptions of the call switching methods, a person skilled in the art may clearly understand an implementation method of the terminal device in this embodiment. Therefore, for brevity of this specification, details are not described herein again.

Figure 6:
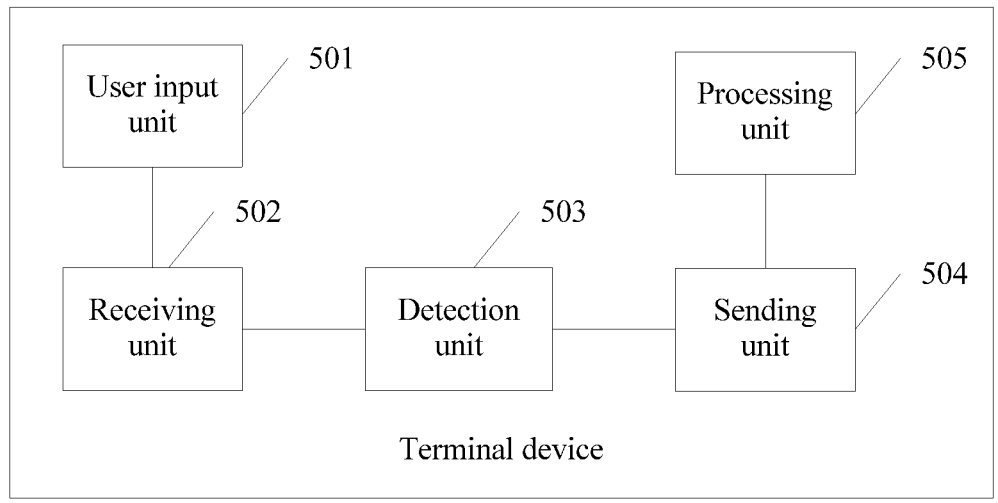
FIG. 6 is a functional block diagram of a first terminal device according to an embodiment of the present disclosure.

Based on a same inventive concept, an embodiment of the present disclosure further provides a terminal device, to implement the call switching methods shown in FIG. 2 and FIG. 3. As shown in FIG. 6, the terminal device includes: a user input unit 501, configured to detect an input operation that is of initiating a call request to a second terminal device and that is input by a user; a receiving unit 502, configured to receive a first call request that is initiated by the second terminal device by using a second-type communications network; a detection unit 503, configured to: when the user input unit 501 detects the input operation or the receiving unit 502 receives the first call request, detect whether both the terminal device and the second terminal device are in a first-type communications network; a sending unit 504, configured to send first prompt information to the second terminal device according to an indication of the processing unit, where the first prompt information is used to indicate that both the terminal device and the second terminal device are in the first-type communications network; and the processing unit 505, configured to: when the detection unit 503 detects that both the terminal device and the second terminal device are in the first-type communications network, initiate a second call request to the second terminal device by using the first-type communications network, or send the first prompt information to the second terminal device by using the sending unit 504, where the first-type communications network is different from the second-type communications network.

Optionally, the processing unit 505 is further configured to: when the detection unit 503 detects that not both the terminal device and the second terminal device are in the first-type communications network, initiate a third call request to the second terminal device by using the second-type communications network.

Optionally, the processing unit 505 is further configured to reject the first call request when the detection unit 503 detects that both the terminal device and the second terminal device are in the first-type communications network.

Optionally, the processing unit 505 is further configured to: before initiating the second call request to the second terminal device by using the first-type communications network, determine that signal quality of the first-type communications network meets a preset condition.

Optionally, the processing unit 505 is configured to: determine that the first terminal device is in the first-type communications network; send a query request to a server by using the sending unit 504, where the query request is used to request to query for a network type of a communications network to which the second terminal device is currently connected, and the server records the network type of the communications network to which the second terminal device is currently connected; receive, by using the receiving unit 502, a query result sent by the server, where the query result includes the network type of the communications network to which the second terminal device is currently connected; and detect, according to the query result, whether both the terminal device and the second terminal device are in the first-type communications network.

Optionally, the processing unit 505 is configured to: receive second prompt information sent by the second terminal device, where the second prompt information includes a network type of a communications network to which the second terminal device is currently connected; and detect, according to a network type of a communications network to which the terminal device is currently connected and the second prompt information, whether both the terminal device and the second terminal device are in the first-type communications network.

Optionally, the processing unit 505 is configured to: receive third prompt information sent by the second terminal device, where the third prompt information is used to indicate whether both the terminal device and the second terminal device are in the first-type communications network; and determine, according to the third prompt information, whether both the terminal device and the second terminal device are in the first-type communications network.

Optionally, the processing unit 505 is further configured to: when the second call request is a video call request, after the second call request is responded, determine whether signal quality of the first-type communications network meets a preset condition; when the signal quality of the first-type communications network does not meet the preset condition, initiate a voice call request to the second terminal device by using the second-type communications network; and after the voice call request is responded, send and receive audio data of a video call by using the second-type communications network, and send and receive image data of the video call by using the first-type communications network.

Optionally, the processing unit 505 is further configured to: after the voice call request is responded, determine whether the signal quality of the first-type communications network meets the preset condition; and when the signal quality of the first-type communications network meets the preset condition, cancel a voice call that is initiated by using the second-type communications network, and send and receive the audio data and the image data of the video call by using the first-type communications network.

Figure 7:
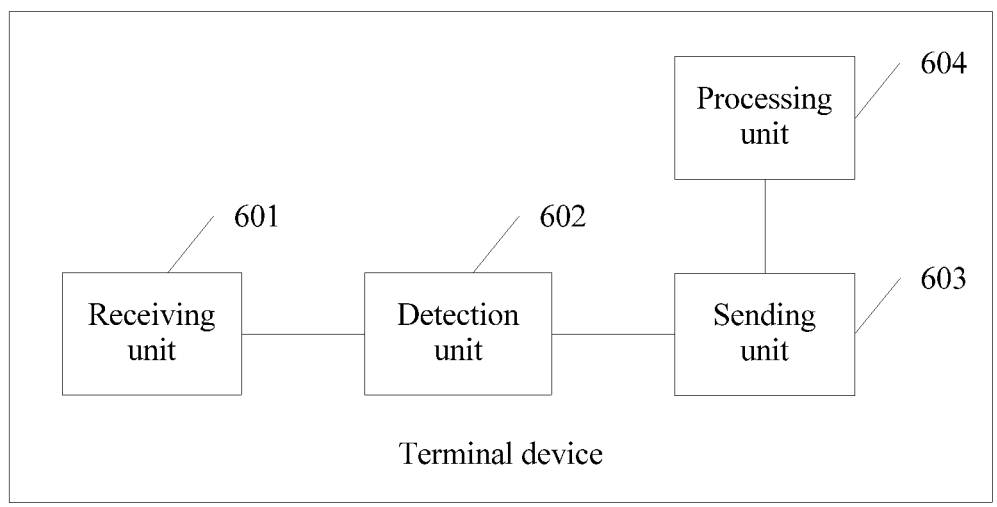
FIG. 7 is a functional block diagram of a second terminal device according to an embodiment of the present disclosure.

Based on a same inventive concept, an embodiment of the present disclosure further provides a terminal device, to implement the call switching method shown in FIG. 3. As shown in FIG. 7, the terminal device includes: a receiving unit 601, configured to receive a first call request that is initiated by a second terminal device by using a second-type communications network; a detection unit 602, configured to detect whether both the terminal device and the second terminal device are in a first-type communications network; a sending unit 603, configured to send first prompt information to the second terminal device according to an indication of the processing unit, where the first prompt information is used to indicate that both the terminal device and the second terminal device are in the first-type communications network; and the processing unit 604, configured to: when both the terminal device and the second terminal device are in the first-type communications network, reject the first call request, and send the first prompt information to the second terminal device by using the sending unit 603, where the first-type communications network is different from the second-type communications network.

Optionally, the processing unit 604 is further configured to: before abandoning the first call request, determine that signal quality of the first-type communications network meets a preset condition.

Optionally, the processing unit 604 is further configured to: send a query request to a server by using the sending unit 603, where the query request is used to query for a network type of a communications network to which the second terminal device is currently connected, and the server records the network type of the communications network to which the second terminal device is currently connected; receive, by using the receiving unit 601, a query result sent by the server, where the query result includes the network type of the communications network to which the second terminal device is currently connected; and detect, according to a network type of a communications network to which the terminal device is currently connected and the query result, whether both the terminal device and the second terminal device are in the first-type communications network.

Figure 8:
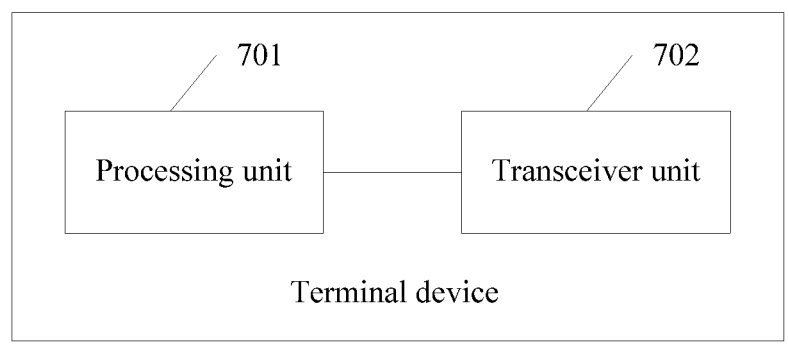
FIG. 8 is a functional block diagram of a third terminal device according to an embodiment of the present disclosure.

Based on a same inventive concept, an embodiment of the present disclosure further provides a terminal device, to implement the call switching methods shown in FIG. 4 and FIG. 5. As shown in FIG. 8, the terminal device includes a processing unit 701 and a transceiver unit 702.

During actual application, the terminal device may be configured according to an actual requirement.

Optionally, when the terminal device is configured to implement the call switching method shown in FIG. 4, the processing unit 701 is configured to: when the terminal device and a second terminal device make a video call by using a first-type communications network, determine whether signal quality of the first-type communications network meets a preset condition; when the signal quality of the first-type communications network does not meet the preset condition, initiate a voice call request to the second terminal device by using a second-type communications network; and the transceiver unit 702 is configured to: after the voice call request is responded, send and receive audio data of the video call by using the second-type communications network, and send and receive image data of the video call by using the first-type communications network, where the first-type communications network is different from the second-type communications network.

Optionally, the processing unit 701 is further configured to: after the voice call request is responded, determine whether the signal quality of the first-type communications network meets the preset condition; and when the signal quality of the first-type communications network meets the preset condition, cancel a voice call that is initiated by using the second-type communications network; and the transceiver unit 702 is further configured to send and receive the audio data and the image data of the video call by using the first-type communications network.

Optionally, when the terminal device is configured to implement the call switching method shown in FIG. 5, the processing unit 701 is configured to: when the terminal device and a second terminal device make a voice call by using a second-type communications network, establish a video call with the second terminal device by using the first-type communications network, and determine whether signal quality of the first-type communications network meets a preset condition; and the transceiver unit 702 is configured to: when the signal quality of the first-type communications network does not meet the preset condition, send and receive audio data of the video call by using the second-type communications network, and send and receive image data of the video call by using the first-type communications network, where the first-type communications network is different from the second-type communications network.

Optionally, the processing unit 701 is further configured to: determine whether the signal quality of the first-type communications network meets the preset condition; and when the signal quality of the first-type communications network meets the preset condition, cancel the voice call that is initiated by using the second-type communications network; and the transceiver unit 702 is further configured to send and receive the audio data and the image data of the video call by using the first-type communications network.

Various variations and specific instances in the call switching methods in some embodiments in FIG. 2 and FIG. 4 are also applicable to the terminal device in this embodiment. According to the foregoing detailed descriptions of the call switching methods, a person skilled in the art may clearly understand an implementation method of the terminal device in this embodiment. Therefore, for brevity of this specification, details are not described herein again.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more non-volatile computer-usable storage media (including but not limited to a magnetic disk storage, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions may be stored in a non-volatile computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A call switching method comprising:
when a first terminal device detects an input operation for initiating a call request to a second terminal device, or when the first terminal device receives a first call request that is initiated by the second terminal device using a second-type communications network, detecting, by the first terminal device, whether both the first terminal device and the second terminal device are in a first-type communications network, wherein detecting whether both the first terminal device and the second terminal device are in a first-type communications network comprises obtaining, by the first terminal device, at least one network type of a communications network to which the second terminal device is currently connected;
when the first terminal device detects that both the first terminal device and the second terminal device are in the first-type communications network:
initiating, by the first terminal device, a second call request to the second terminal device using the first-type communications network, or sending, by the first terminal device, first prompt information to the second terminal device, wherein the first prompt information is used to indicate that both the first terminal device and the second terminal device are in the first-type communications network, wherein the first-type communications network is different from the second-type communications network; and when the second call request is a video call request, after the second call request is responded, the method further comprises:
  determining, by the first terminal device, whether signal quality of the first-type communications network meets a preset condition;
  when the signal quality of the first-type communications network does not meet the preset condition, initiating, by the first terminal device, a voice call request to the second terminal device by using the second-type communications network; and
  after the voice call request is responded, sending and receiving, by the first terminal device, audio data of the video call by using the second-type communications network, and sending and receiving image data of the video call by using the first-type communications network.

2. The method of claim 1, wherein the method further comprises:
  when the first terminal device detects that both the first terminal device and the second terminal device are not in the first-type communications network, initiating, by the first terminal device, a third call request to the second terminal device using the second-type communications network.

3. The method of claim 1, wherein the method further comprises:
  rejecting, by the first terminal device, the first call request when the first terminal device detects that both the first terminal device and the second terminal device are in the first-type communications network.

4. The method of claim 1, further comprising initiating the second call request, wherein before the initiating the second call request, the method further comprises:
  determining, by the first terminal device, that signal quality of the first-type communications network meets a preset condition.

5. The method of claim 1, wherein the detecting further comprises:
  determining, by the first terminal device, that the first terminal device is in the first-type communications network;
  sending, by the first terminal device, a query to a server, wherein the query requests a network type of a communications network to which the second terminal device is currently connected, and the server records the network type of the communications network to which the second terminal device is currently connected;
  receiving, by the first terminal device, a query result sent by the server, wherein the query result comprises the network type of the communications network to which the second terminal device is currently connected; and
  detecting, by the first terminal device according to the query result, whether the second terminal device is in the first-type communications network.

6. The method of claim 1, wherein the detecting comprises:
  receiving, by the first terminal device, second prompt information sent by the second terminal device, wherein the second prompt information comprises a network type of a communications network to which the second terminal device is currently connected; and
  detecting, by the first terminal device according to a network type of a communications network to which the first terminal device is currently connected and the second prompt information, whether both the first terminal device and the second terminal device are in the first-type communications network.

7. The method of claim 1, wherein the detecting comprises:
  receiving, by the first terminal device, third prompt information sent by the second terminal device, wherein the third prompt information is used to indicate whether both the first terminal device and the second terminal device are in the first-type communications network; and
  determining, by the first terminal device according to the third prompt information, whether both the first terminal device and the second terminal device are in the first-type communications network.

8. The method of claim 1, wherein after the voice call request is responded, the method further comprises:
  determining, by the first terminal device, whether the signal quality of the first-type communications network meets the preset condition; and
  when the signal quality of the first-type communications network meets the preset condition, canceling, by the first terminal device, a voice call that is initiated to the second terminal device using the second-type communications network, and sending and receiving the audio data and the image data of the video call using the first-type communications network.

9. The method of claim 1, wherein
  the first terminal device has a first account and a second account, and the second terminal device has a third account and a fourth account;
  the first account is associated with the second account, and the third account is associated with the fourth account;
  the first account and the third account may establish a call request using the second-type communications network; and
  the second account and the fourth account may establish a call request using the first-type communications network.

10. The method of claim 9, wherein the first account and the second account are mobile numbers, the third account is a unique identifier of the first terminal device, and the fourth account is a unique identifier of the second terminal device.

11. The method of claim 1, wherein the first-type communications network is a Long Term Evolution (LTE) network or a Wireless Fidelity (WiFi) network.

12. The method of claim 1, wherein the second-type communications network is a Global System for Mobile Communications (GSM) or Code Division Multiple Access (CDMA) network.

13. A terminal device comprising:
  a processor; and
  a non-transitory computer-readable storage medium coupled to the processor and storing programming instructions for execution by the processor, the programming instructions instruct the processor to:
    detect whether both the terminal device and a second terminal device are in a first-type communications network when the terminal device detects an input operation for initiating a call request to the second terminal device, or when the terminal device receives a first call request that is initiated by the second terminal device using a second-type communications network, wherein detecting whether both the first terminal device and the second terminal device are in a first-type communications network comprises obtaining, by the terminal device, at least one network type of a communications network to which the second terminal device is currently connected;

when the terminal device detects that both the terminal device and the second terminal device are in the first-type communications network:
  initiate a second call request to the second terminal device using the first-type communications network, or send first prompt information to the second terminal device, wherein the first prompt information is used to indicate that both the terminal device and the second terminal device are in the first-type communications network, wherein the first-type communications network is different from the second-type communications network; and
when the second call request is a video call request, after the second call request is responded:
  determine whether signal quality of the first-type communications network meets a preset condition;
  when the signal quality of the first-type communications network does not meet the preset condition, initiate a voice call request to the second terminal device by using the second-type communications network; and
  after the voice call request is responded, send and receive audio data of the video call by using the second-type communications network, and send and receive image data of the video call by using the first-type communications network.

14. The terminal device of claim 13, wherein the programming instructions further instruct the processor to: when detecting that both the terminal device and the second terminal device are not in the first-type communications network, initiate a third call request to the second terminal device using the second-type communications network.

15. The terminal device of claim 13, wherein the programming instructions further instruct the processor to reject the first call request when detecting that both the terminal device and the second terminal device are in the first-type communications network.

16. The terminal device of claim 13, wherein the programming instructions further instruct the processor to: before initiating the second call request to the second terminal device using the first-type communications network, determine that signal quality of the first-type communications network meets a preset condition.

17. The terminal device of claim 13, wherein the programming instructions further instruct the processor to: determine that the terminal device is in the first-type communications network; send a query to a server using the terminal device, wherein the query requests a network type of a communications network to which the second terminal device is currently connected, and the server records the network type of the communications network to which the second terminal device is currently connected; receive, using the terminal device, a query result sent by the server, wherein the query result comprises the network type of the communications network to which the second terminal device is currently connected; and detect, according to the query result, whether both the terminal device and the second terminal device are in the first-type communications network.

18. The terminal device of claim 13, wherein the programming instructions further instruct the processor to: receive, using the terminal device, second prompt information sent by the second terminal device, wherein the second prompt information comprises a network type of a communications network to which the second terminal device is currently connected; and detect, according to a network type of a communications network to which the terminal device is currently connected and the second prompt information, whether both the terminal device and the second terminal device are in the first-type communications network.

19. A non-transitory computer-readable medium having instructions stored therein, which when executed by a processor, cause the processor to perform operations, the operations comprising:
  when a first terminal device detects an input operation for initiating a call request to a second terminal device, or when the first terminal device receives a first call request that is initiated by the second terminal device using a second-type communications network, detecting, by the first terminal device, whether both the first terminal device and the second terminal device are in a first-type communications network, wherein detecting whether both the first terminal device and the second terminal device are in a first-type communications network comprises obtaining, by the first terminal device, at least one network type of a communications network to which the second terminal device is currently connected;
  when the first terminal device detects that both the first terminal device and the second terminal device are in the first-type communications network:
    initiating, by the first terminal device, a second call request to the second terminal device using the first-type communications network, or sending, by the first terminal device, first prompt information to the second terminal device, wherein the first prompt information is used to indicate that both the first terminal device and the second terminal device are in the first-type communications network, wherein the first-type communications network is different from the second-type communications network; and
  when the second call request is a video call request, after the second call request is responded, the operations further comprise:
    determining, by the first terminal device, whether signal quality of the first-type communications network meets a preset condition;
    when the signal quality of the first-type communications network does not meet the preset condition, initiating, by the first terminal device, a voice call request to the second terminal device by using the second-type communications network; and
    after the voice call request is responded, sending and receiving, by the first terminal device, audio data of the video call by using the second-type communications network, and sending and receiving image data of the video call by using the first-type communications network.

* * * * *